United States Patent
Lee et al.

(10) Patent No.: US 11,346,855 B2
(45) Date of Patent: May 31, 2022

(54) SYSTEM FOR FREEING STUCK ACCELEROMETERS

(71) Applicant: Apple Inc., Cupertino, CA (US)

(72) Inventors: Qinghung Lee, San Jose, CA (US); Christopher C. Painter, Dublin, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/033,563

(22) Filed: Sep. 25, 2020

(65) Prior Publication Data
US 2022/0099701 A1    Mar. 31, 2022

(51) Int. Cl.
| | |
|---|---|
| *G01P 21/00* | (2006.01) |
| *G01P 1/02* | (2006.01) |
| *G01P 15/125* | (2006.01) |
| *H04W 88/02* | (2009.01) |

(52) U.S. Cl.
CPC ............ *G01P 21/00* (2013.01); *G01P 1/023* (2013.01); *G01P 15/125* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2014/0345380 A1* | 11/2014 | Jia ................ | B81C 1/00968 |
| | | | 73/514.32 |
| 2019/0062147 A1* | 2/2019 | Castro ............ | B81C 99/0045 |
| 2021/0061641 A1* | 3/2021 | Hu ................. | B81B 3/0013 |

OTHER PUBLICATIONS

Savkar, et al., "On the Use of Structural Vibrations to Release Stiction Failed MEMS," Journal of Microelectromechanical Systems, Feb. 2007, vol. 16, No. 1, pp. 163-173.

* cited by examiner

*Primary Examiner* — Walter L Lindsay, Jr.
*Assistant Examiner* — Andrew V Do
(74) *Attorney, Agent, or Firm* — BakerHostetler (57) ABSTRACT

According to some aspects of the subject technology, an apparatus includes an accelerometer including one or more sense electrodes to sense an input acceleration, and an unstick device to free the accelerometer from a stuck state due to a saturating acceleration input. The unstick device includes at least one unstick electrode and a control circuitry to cause the unstick electrode to generate vibrational energy to free the accelerometer.

20 Claims, 8 Drawing Sheets

SYSTEM FOR FREEING STUCK ACCELEROMETERS

TECHNICAL FIELD

The present description relates generally to sensor technology, and, more particularly, but not exclusively, to a system for freeing stuck accelerometers.

BACKGROUND

An accelerometer is an electromechanical device used to measure acceleration forces. Such forces may be static, like the continuous force of gravity, or, as is the case with many mobile devices, dynamic in order to sense movement or vibrations. Acceleration is the measurement of the change in velocity, or speed divided by time. Portable electronic devices such as smartphones and smartwatches include microelectromechanical system (MEMS) capacitive accelerometers for perceiving device orientation. The accelerometer monitors the motion of the device in order to enable various motion-based features.

A user reliability issue with a MEMS capacitive accelerometer device is the stiction of the device after high acceleration shock events. Stiction is when the accelerometer becomes stuck to a contact surface and remains even after cessation of the high acceleration input, which renders the accelerometer inoperable. A subsequent high acceleration shock or vibration input may unstick the part from the contact surface, but there are no methods for achieving this in a controlled fashion in the system.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description, which includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

In some aspects, the subject disclosure provides a system for freeing stuck accelerometers. The disclosed solution implements a controlled vibration system for purposes of unsticking a stuck part of the accelerometer such as a microelectromechanical system (MEMS) capacitive accelerometer. The subject technology comprises both a means for implementing the vibration as well as a means for stiction detection that controls initiation of the vibration. Methods of vibration input include piezoelectric exciters and/or capacitors located outside the accelerometer package. The disclosed method of detection of the saturation (stiction) includes in-situ circuitry for detection of saturation due to contact and hosts digital implementation for detecting clipping of the output, as described in more detail herein.

Figure 1A:
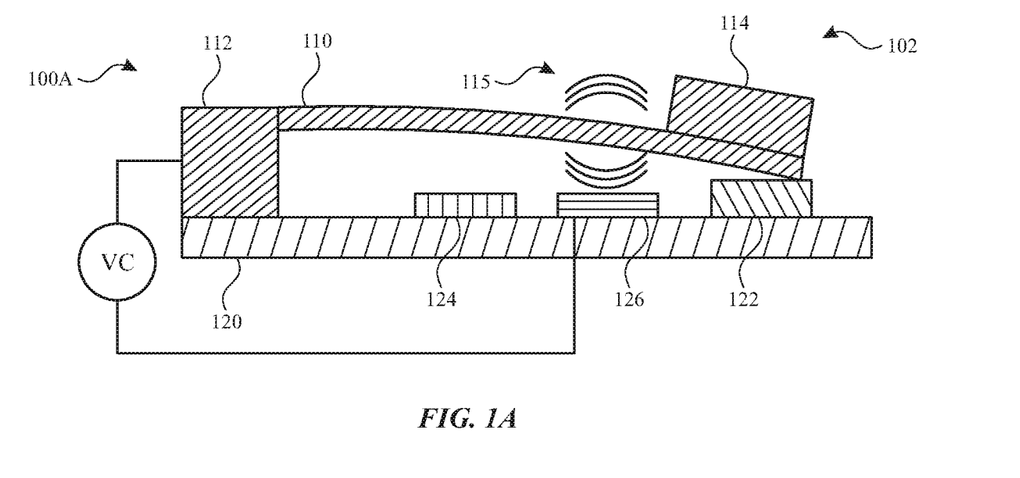
FIGS. 1A and 1B are schematic diagrams illustrating a stuck state and a free state of an example of a microelectromechanical system (MEMS) capacitive accelerometer in stuck and free states, in accordance with various aspects of the subject technology.
Figure 1B:
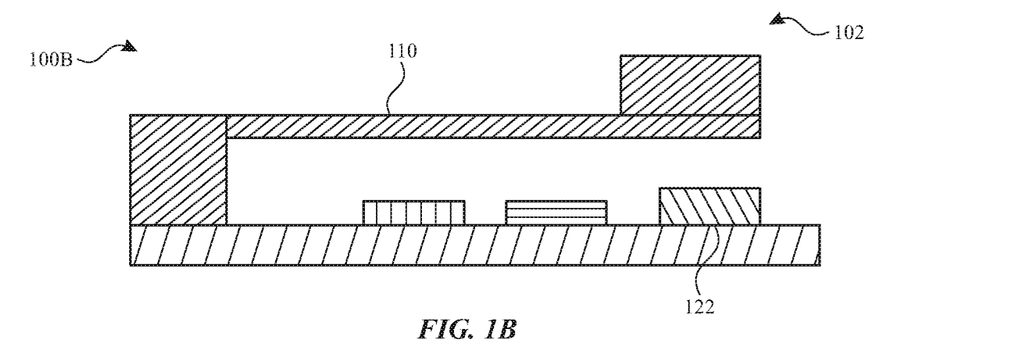

FIGS. 1A and 1B are schematic diagrams illustrating a stuck state 100A and a free state 100B of an example of a MEMS capacitive accelerometer 102, in accordance with various aspects of the subject technology. The MEMS capacitive accelerometer 102 (hereinafter, the accelerometer 102) includes a cantilever 110, an anchor 112, a weight 114, a substrate 120, an over-range stop pad 122 (hereinafter, the stop pad 122), a sense electrode 124, an unstick electrode 126 and a control voltage Vc. The stop pad 122 limits the travel of the cantilever 110 during high accelerations. In the stuck state 100A, the cantilever 110 gets stuck due to surface adhesion forces (e.g., van der Waals forces) to the contact surface of the stop pad 122 after a high acceleration input and remains in that state after cessation of the high acceleration input. The sense electrode 124 is used to sense and measure the input acceleration applied to the accelerometer 102.

The unstick electrode 126 is a feature of the subject technology that enables freeing the stuck cantilever by applying high energy vibrations 115. The high energy vibrations 115 are created by an electrostatic force generated by activation of the control voltage Vc, which is applied between an unstick electrode 126 and the anchor 112 that is electrically connected to the cantilever 110. FIG. 1 B shows the free state 100B when the applied high energy vibrations 115 have released the cantilever 110 and the accelerometer 102 is ready for normal operation, and the sense electrode 124 can detect input accelerations.

Figure 2A:
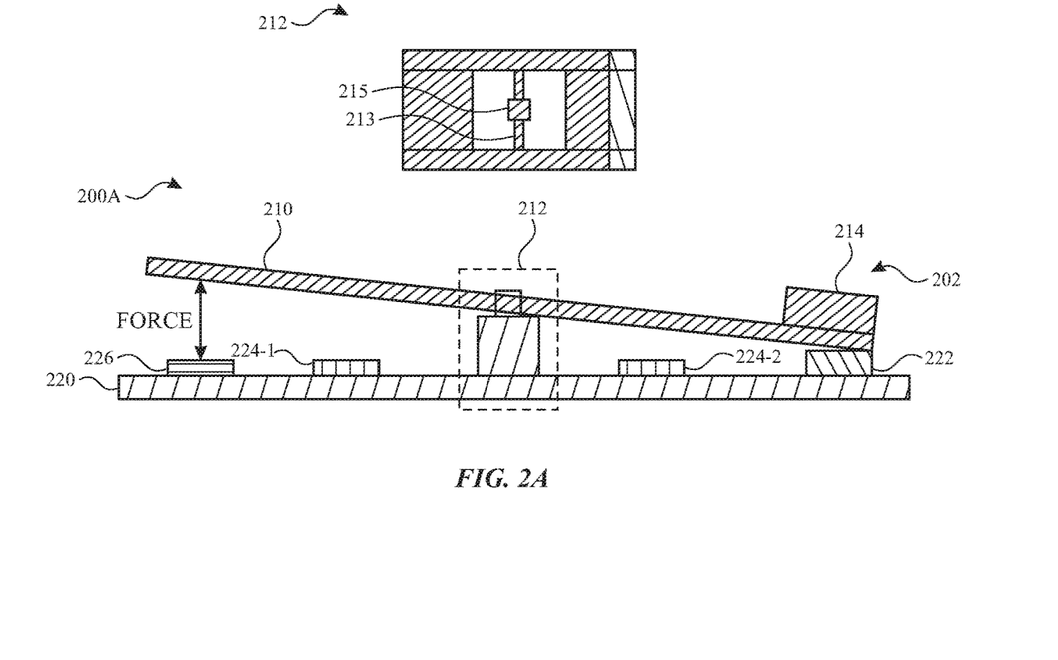
FIGS. 2A and 2B are schematic diagrams illustrating example structures of MEMS capacitive accelerometers with provisions for freeing from the stuck state, in accordance with various aspects of the subject technology.
Figure 2B:
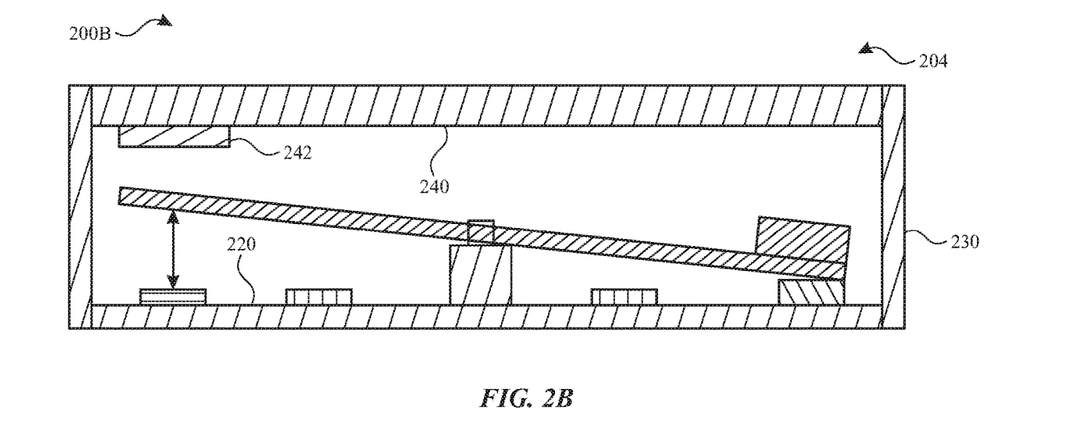

FIGS. 2A and 2B are schematic diagrams illustrating example structures 200A and 200B of MEMS capacitive accelerometers 202 and 204 with provisions for freeing from the stuck state (stiction), in accordance with various aspects of the subject technology. The MEMS capacitive accelerometer 202 (hereinafter, the accelerometer 202) is a pendulous type of accelerometer that has a different structure from the accelerometer 102 and includes a cantilever 210 supported by a fulcrum 212. The fulcrum 212 includes a torsion spring 213 and a middle anchor 215. The accelerometer 202 further includes a substrate 220, a stop pad 222, sense electrodes 224 (224-1 and 224-2), an unstick electrode 226 and a weight 214. The unstick electrode 226 can be used to release the accelerometer 202 from a stuck state by applying an attractive electrostatic force to an opposite end of the cantilever 210. The electronic circuitry that creates the electrostatic force will be discussed below.

The MEMS capacitive accelerometer 204 (hereinafter, the accelerometer 204) is a pendulous type of accelerometer similar to the accelerometer 202 of FIG. 2A, except that it is enclosed in a housing, including walls 230 and a lid 240. Additionally, the accelerometer 204 includes an unstick electrode 242 that is attached to the lid 240 and can be used to further assist with freeing the accelerometer 204 from a stuck state by applying a repulsive electrostatic force to the opposite end of the cantilever 210. The electronic circuitry that creates the repulsive electrostatic force will be discussed below. In one or more aspects, the lid 240 can be used as a giant unstick electrode. The additional repulsive electrostatic force exerted by the unstick electrode 242 or the lid 240 can enhance the release mechanism of the accelerometer 204 and make it a more reliable accelerometer device.

Figure 3A:
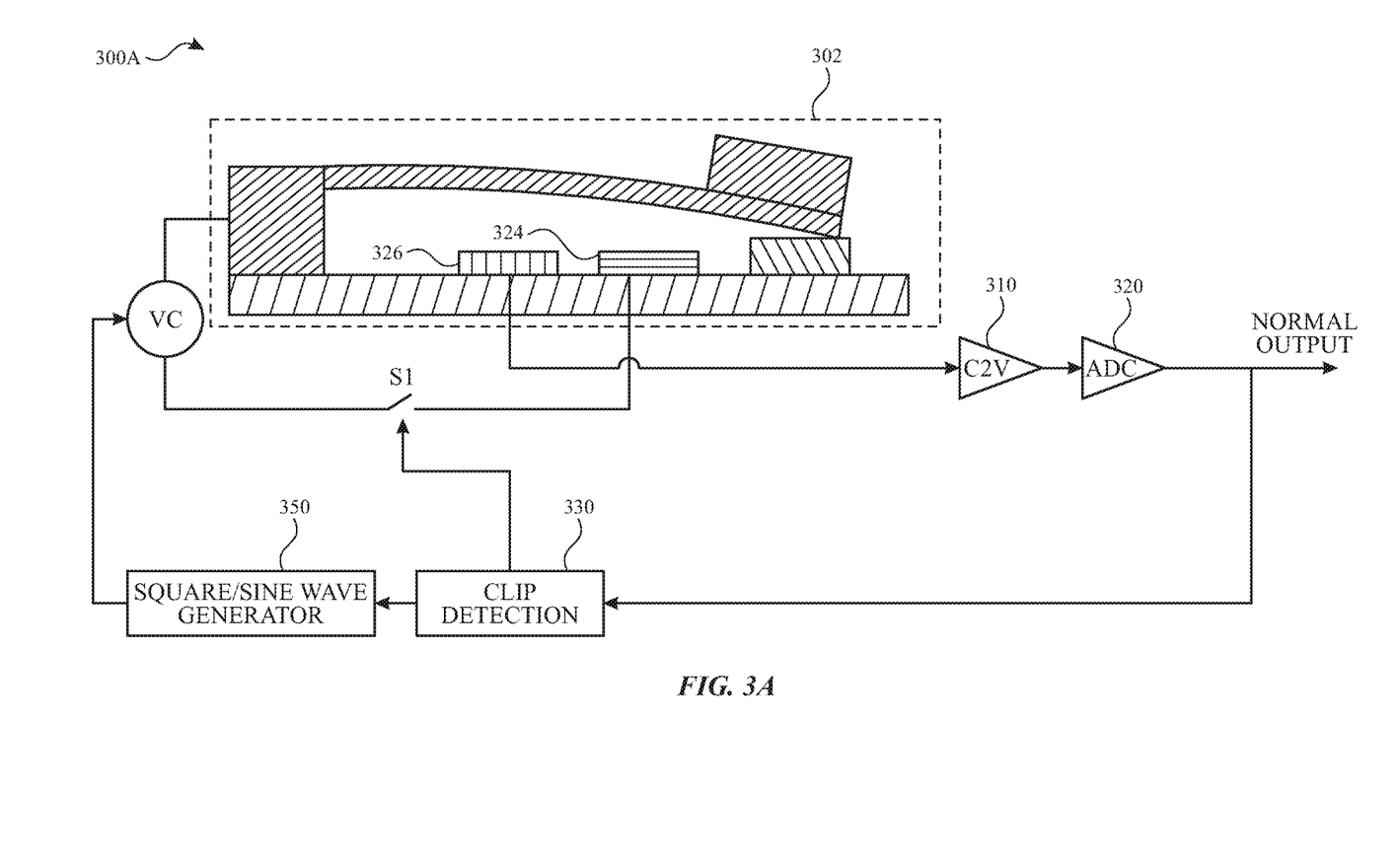
FIGS. 3A, 3B and 3C are schematic diagrams illustrating examples of MEMS capacitive accelerometer systems with electronic circuitry for freeing from the stuck state, in accordance with various aspects of the subject technology.
Figure 3B:
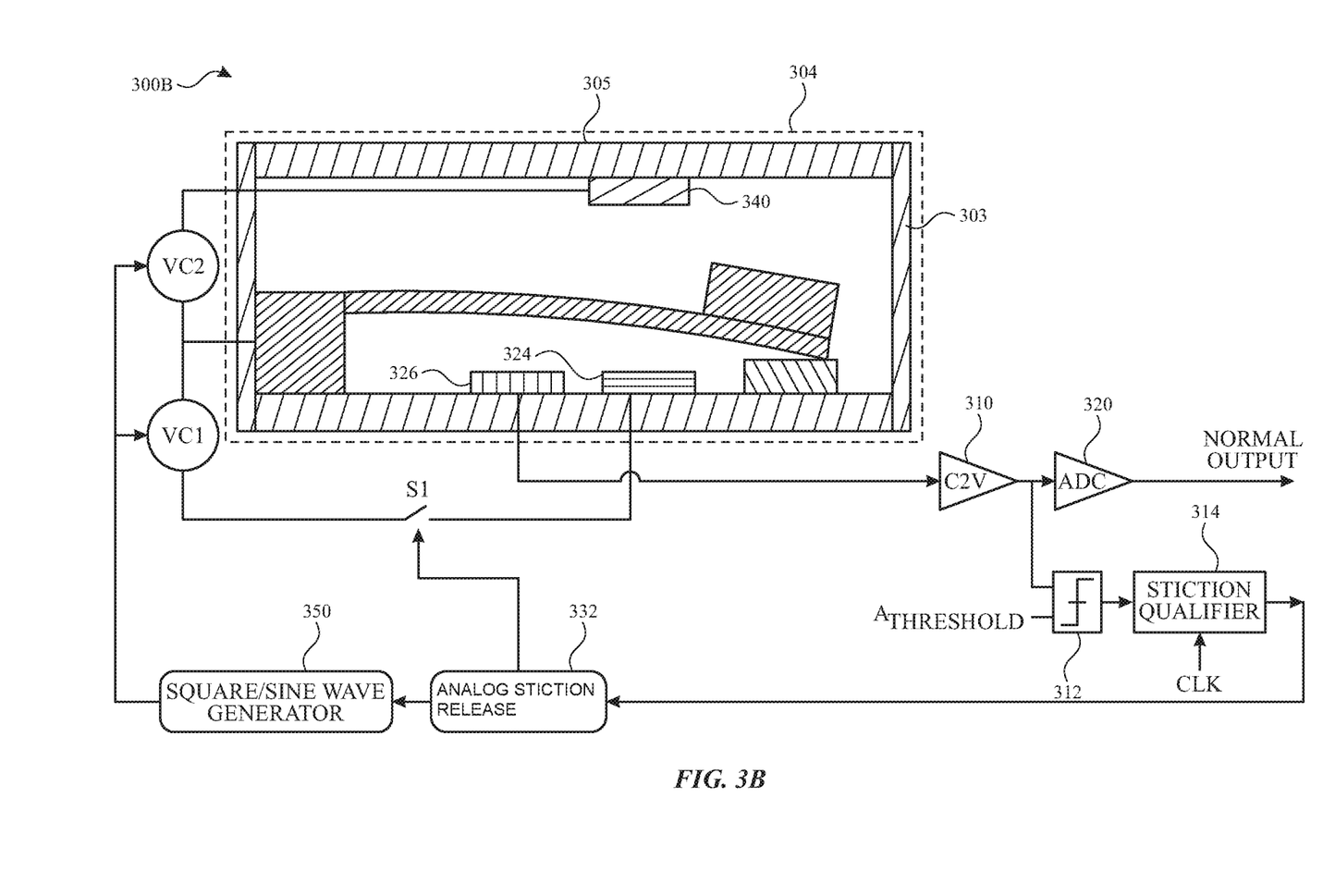
Figure 3C:
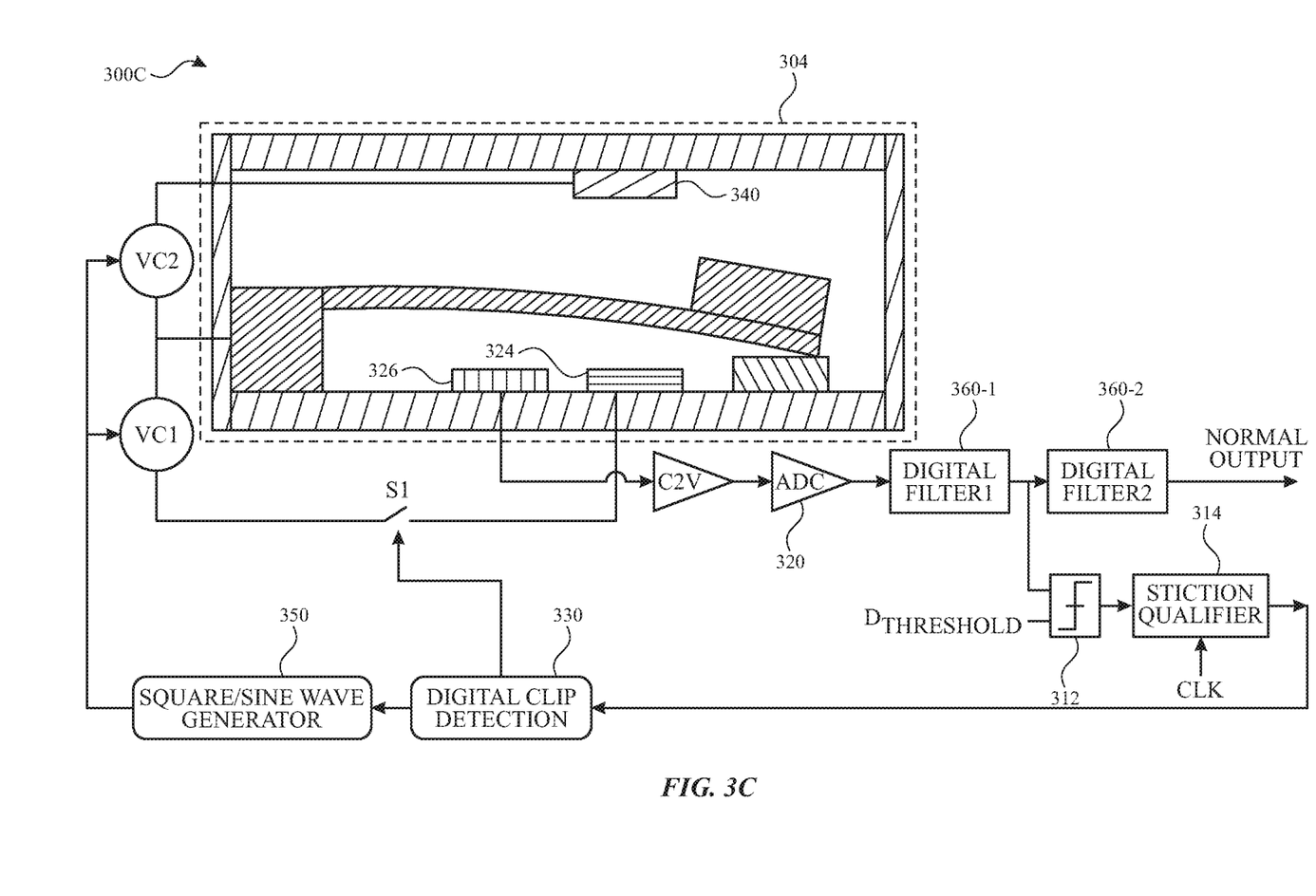

FIGS. 3A, 3B and 3C are schematic diagrams illustrating examples of MEMS capacitive accelerometer systems 300A, 300B and 300C with electronic circuitry for freeing from the stuck state (stiction), in accordance with various aspects of the subject technology. The MEMS capacitive accelerometer system 300A (hereinafter, the accelerometer system 300A) includes an accelerometer device 302 and an associated electronic circuitry (e.g., an ASIC) including a charge-to-voltage (C2V) converter 310, an analog-to-digital converter (ADC) 320, a clip-detection circuit 330, a switch S1 and a wave generator 350. The accelerometer device 302 is the same as the accelerometer 102 of FIG. 1A, including a sense electrode 326 and an unstick electrode 324 similar to the sense electrode 126 and unstick electrode 124 of FIG. 1A. The C2V converter 310 receives a charge signal that represents a measure of the input acceleration from the sense electrode 326 and generates an analog voltage signal proportional to the charge signal. The analog voltage signal generated by the C2V converter 310 is converted to a digital signal by the ADC 320. The digital signal is the normal output of the accelerometer system 300A.

The normal state of the switch S1 is open and isolates the unstick electrode 324 from the control voltage Vc. The clip-detection circuit 330 can detect a stuck state of the accelerometer device 302 based on the digital signal received from the ADC 320. When a stuck state is detected, the clip-detection circuit 330 causes the wave generator 350 to generate the control voltage Vc and the switch S1 to close to allow the control voltage Vc to be applied to the unstick electrode 324. The unstick electrode 324, in response to receiving the control voltage Vc, generates an electrostatic force, which creates a high vibrational energy that frees the accelerometer device from a stuck state. In one or more implementations, the clip-detection circuit 330 may receive an interrupt signal from a host processor indicating stiction of the accelerometer device 302. The host processor may execute a clip-detection algorithm by comparing the digital signal received from the ADC 320 with a threshold value and generating the interrupt signal when the digital signal exceeds the threshold value.

The MEMS capacitive accelerometer system 300B (hereinafter, the accelerometer system 300B) includes an accelerometer device 304 and an associated electronic circuitry, including the C2V converter 310, a comparator 312, a stiction qualifier 314, the ADC 320, an analog stiction-release circuit 332, the switch S1 and a wave generator 350. The accelerometer system 300B is similar to the accelerometer system 300A except that the accelerometer system 300B is enclosed in a housing, including walls 303 and a lid 305 and includes an additional unstick electrode 340. The output of the ADC 320 is the normal output signal of the accelerometer device 304. The comparator 312 compares the analog voltage signal of the C2V converter 310 with an analog threshold voltage ($A_{threshold}$) and, when the amplitude of the analog voltage signal of the C2V converter 310 exceeds $A_{threshold}$, sends a pulse (output of the comparator 312) to the stiction qualifier 314, which, when qualifies the stiction event, sends a stiction indictor signal to the analog stiction-release circuit 332 as an indication of a stiction state. In response, the analog stiction-release circuit 332 triggers the wave generator 350 to generate the control voltages Vc1 and Vc2 and the switch S1 to close to allow the control voltages Vc1 and Vc2 to be applied to the unstick electrode 324 and the additional unstick electrode 340. The unstick electrode 324 and the additional unstick electrode 340, in response to receiving the control voltage Vc, generate an electrostatic force, which creates a high vibrational energy that frees the accelerometer device from a stuck state.

The MEMS capacitive accelerometer system 300C (hereinafter, the accelerometer system 300C) includes the accelerometer device 304 and an associated electronic circuitry, including the C2V converter 310, the ADC 320, a first digital filter 360-1, a second digital filter 360-2, the comparator 312, the stiction qualifier 314, a digital clip-detection circuit 330, the switch S1 and the wave generator 350. The accelerometer system 300C is similar to the accelerometer system 300B except for the addition of the first digital filter 360-1 and the second digital filter 360-2. The output of the ADC 320 is filtered by the first digital filter 360-1 and the second digital filter 360-2 to generate the normal output signal of the accelerometer device 304. The comparator 312 compares the filtered digital signal of the first digital filter 360-1 with a digital threshold voltage ($D_{threshold}$) and, when the filtered digital signal exceeds $D_{threshold}$, sends a pulse to the stiction qualifier 314, which, when qualifies the stiction event, sends a stiction indictor signal to the digital clip-detection circuit 330 as an indication of a stiction state. In response, the analog stiction-release circuit 332 triggers the wave generator 350 to generate the control voltages Vc1 and Vc2 and the switch S1 to close to allow the control voltages Vc1 and Vc2 to be applied to the unstick electrode 324 and the additional unstick electrode 340. The unstick electrode 324 and the additional unstick electrode 340, in response to receiving the control voltage Vc, generate an electrostatic force, which creates a high vibrational energy that frees the accelerometer device from a stuck state.

Figure 4:
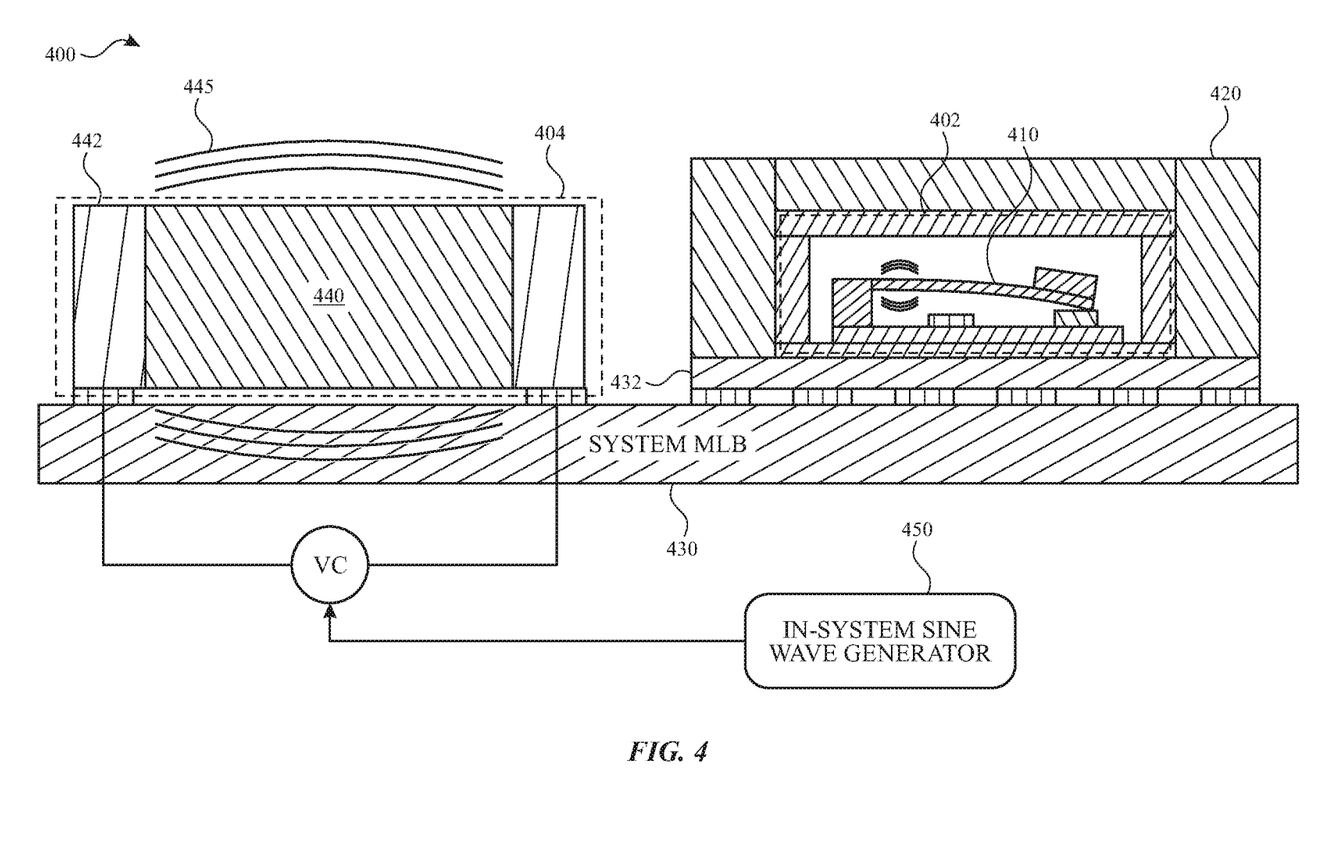
FIG. 4 is a schematic diagram illustrating an example of a MEMS capacitive accelerometer with an external vibrational stimulation, in accordance with various aspects of the subject technology.

FIG. 4 is a schematic diagram illustrating an example of a MEMS capacitive accelerometer system 400 with an external vibrational stimulation, in accordance with various aspects of the subject technology. The MEMS capacitive accelerometer system 400 (hereinafter, system 400) includes a MEMS capacitive accelerometer device 402 (hereinafter, accelerometer device 402), a housing 420, an external vibrational stimulator 404 and an in-system wave generator 450. The accelerometer device 402 is similar to the accelerometer device 304 of FIG. 3B except that the unstick electrode 324 and the additional unstick electrode 340 are replaced with the external vibrational stimulator 404. The accelerometer device 402 is disposed on a substrate 432, which in turn is placed on a system main logic board (MLB) 430 and is electronically connected to it through a number of vias.

The external vibrational stimulator 404 includes a piezoelectric material 440 attached to electrodes 442, which are connected through the system MLB 430 to the in-system wave generator 450. In response to signals (e.g., sine wave signals) from the in-system wave generator 450, a control voltage Vc is generated that causes vibration (e.g., at a few KHz) of the piezoelectric material 440. Vibrational waves 445 generated by the piezoelectric material 440 can couple to the cantilever 410 of the accelerometer device 402 and free it from a stuck state. The in-system wave generator 450 responds to an interrupt signal from an analog or digital clip detection, as discussed in more detail below.

Figure 5A:
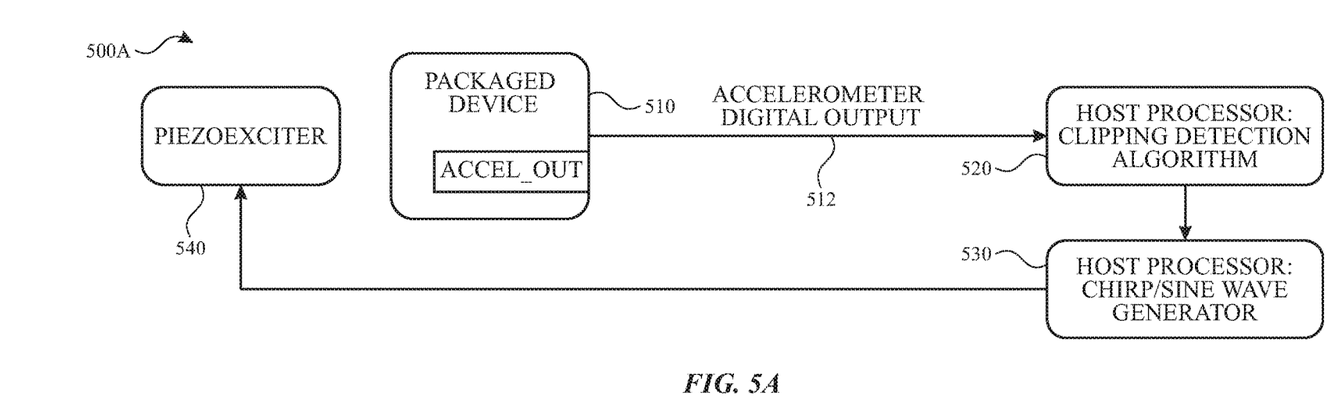
FIGS. 5A, 5B and 5C are schematic diagrams illustrating examples of packaging schemes for the MEMS capacitive accelerometer of FIG. 4, in accordance with various aspects of the subject technology.
Figure 5B:
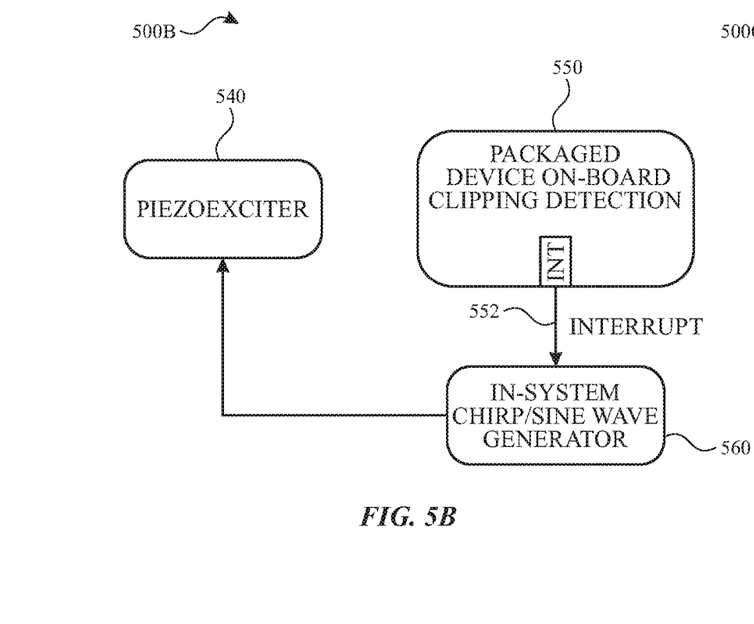
Figure 5C:
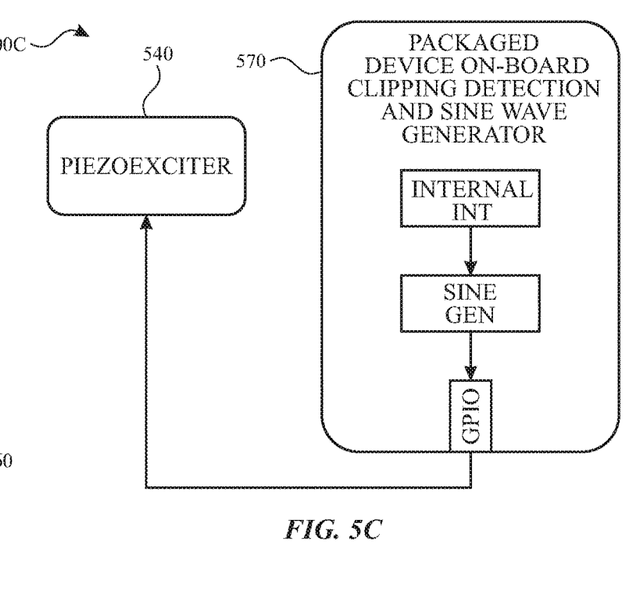

FIGS. 5A, 5B and 5C are schematic diagrams illustrating examples of various packaging schemes 500A, 500B and 500C for the MEMS capacitive accelerometer of FIG. 4, in accordance with various aspects of the subject technology. In the packaging scheme 500A, the packaged accelerometer device 510 includes the accelerometer device, a C2V converter (e.g., 310 of FIG. 3A), an ADC (e.g., 320 of FIG. 3A) and generates an accelerometer digital output 512, which is processed by a host processor (e.g., a processor of a host device such as a smartphone or a smartwatch). The host processor may use a clipping detection algorithm 520 to detect whether the digital output 512 corresponds to a stuck or normal state of the accelerometer device, and, when a stuck accelerometer situation is detected, cause a wave generator algorithm 530 to generate a chirp or a sine wave (e.g., a frequency of a few KHz) that can be used by a piezo exciter 540 to excite an external vibrational stimulator (e.g., 404 of FIG. 4).

In the packaging scheme 500B, the packaged accelerometer device 550 includes the accelerometer device, a C2V converter (e.g., 310 of FIG. 3A), an ADC (e.g., 320 of FIG. 3A) and an onboard clipping detection circuit that generates an interrupt 552 when a stuck accelerometer situation is detected. The interrupt 552 causes an in-system wave generator 560 to generate a chirp or a sine wave (e.g., a frequency of a few KHz) that can be used by the piezo exciter 540 to excite the external vibrational stimulator (e.g., 404 of FIG. 4).

In the packaging scheme 500C, the packaged accelerometer device 570 includes the accelerometer device, a C2V converter (e.g., 310 of FIG. 3A), an ADC (e.g., 320 of FIG. 3A) and an onboard clipping detection circuit that generates an internal interrupt for an onboard sine wave generator. When a stuck accelerometer situation is detected, the packaged accelerometer device 570 generates sine waves (or chirp waves) at a general-purpose input-output (GPIO) port. The GPIO port is connected to the piezo exciter 540 that can use the generated waves to excite the external vibrational stimulator (e.g., 404 of FIG. 4).

Figure 6:
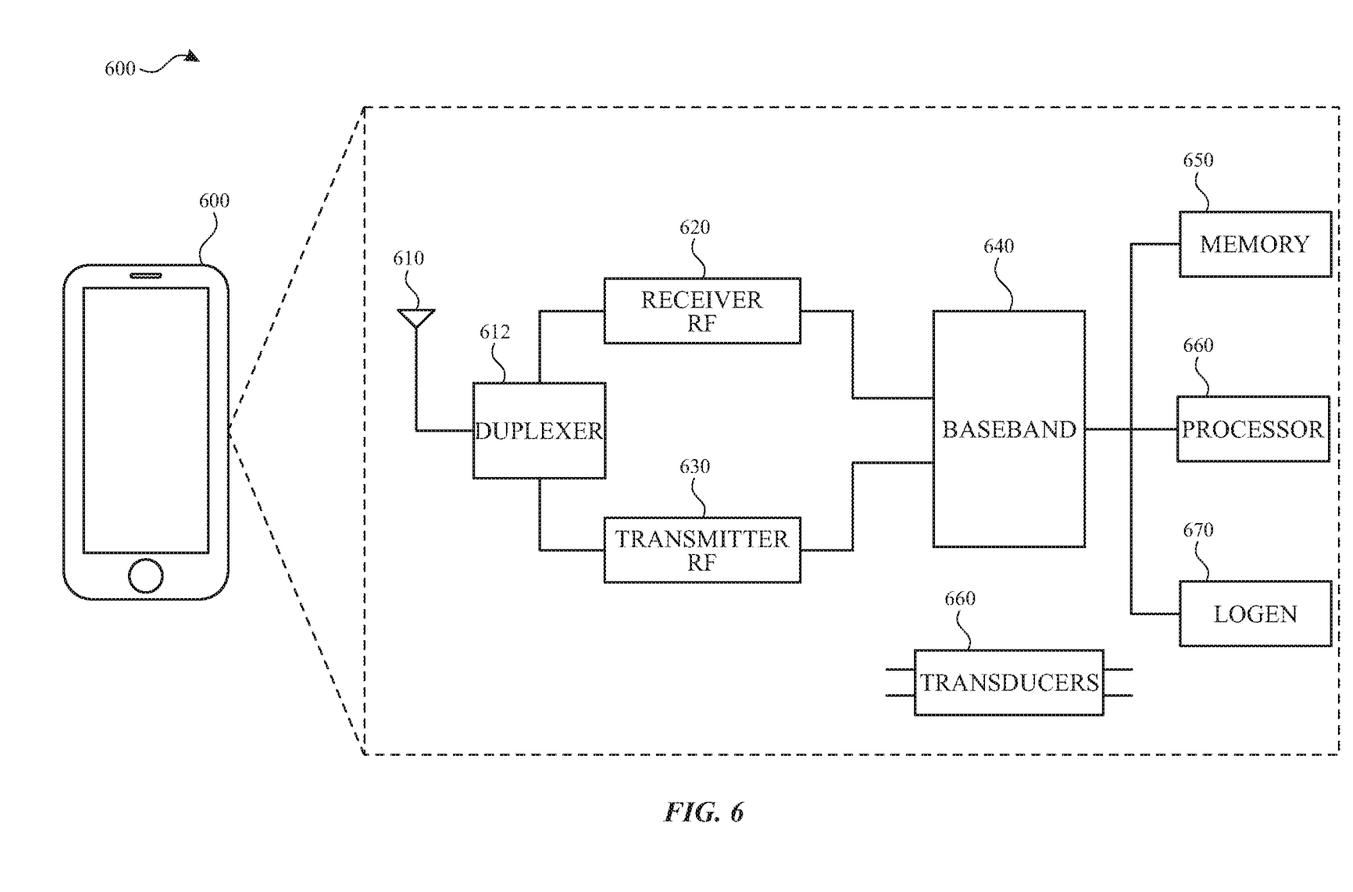
FIG. 6 illustrates a wireless communication device in which aspects of the subject technology are implemented.

FIG. 6 illustrates a wireless communication device in which aspects of the subject technology are implemented. In one or more implementations, the wireless communication device 600 can be a smartphone or a smartwatch that hosts the accelerometer of the subject technology, including a system for freeing the accelerometer when it is stuck due to a high acceleration input. The wireless communication device 600 may comprise a radio-frequency (RF) antenna 610, a duplexer 612, a receiver 620, a transmitter 630, a baseband processing module 640, a memory 650, a processor 660, a local oscillator generator (LOGEN) 670 and one or more transducers 680. In various embodiments of the subject technology, one or more of the blocks represented in FIG. 6 may be integrated on one or more semiconductor substrates. For example, the blocks 620-670 may be realized in a single chip or a single system on a chip, or may be realized in a multichip chipset.

The receiver 620 may comprise suitable logic circuitry and/or code that may be operable to receive and process signals from the RF antenna 610. The receiver 620 may, for example, be operable to amplify and/or down-convert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards, Wi-Fi, WiMAX, Bluetooth, and various cellular standards.

The transmitter 630 may comprise suitable logic circuitry and/or code that may be operable to process and transmit signals from the RF antenna 610. The transmitter 630 may, for example, be operable to up-convert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receiver band. The duplexer 612 may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600, such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfer of data between various portions of the wireless communication device 600. Additionally, the processor 660 may enable implementation of an operating system or otherwise execute code to manage operations of the wireless communication device 600.

In operation, the processor 660 may configure the various components of the wireless communication device 600 based on a wireless standard according to which it is desired to receive signals. Wireless signals may be received via the RF antenna 610, amplified, and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode, and perform other processing on audio, video, and/or control signals to be transmitted by the transmitter 630 in accordance with various wireless standards.

In some implementations, the processor 660 may perform the functionalities of the host processor of FIG. 5A to execute the clipping detection algorithm 520 of FIG. 5A and/or to generate chip and/or sine waves.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiments of the subject technology, information stored in the memory 650 may be utilized for configuring the receiver 620 and/or the baseband processing module 640.

The LOGEN 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

The one or more transducers 680 may include miniature transducers such as the accelerometer of the subject technology including a system for freeing the accelerometer when it is stuck due to a high acceleration input.

In accordance with various aspects of the subject disclosure, an apparatus includes an accelerometer including one or more sense electrodes to sense an input acceleration, and an unstick device to free the accelerometer from a stuck state due to a saturating acceleration input. The unstick device includes at least one unstick electrode and a control circuitry to cause the unstick electrode to generate vibrational energy to free the accelerometer.

In accordance with other aspects of the subject disclosure, a wireless communication system includes a processor and an accelerometer apparatus to measure an input acceleration. The accelerometer apparatus comprises an accelerometer and an unstick device. The accelerometer includes a cantilever and at least one sense electrode to sense the input acceleration and to generate a current signal based on the input acceleration. The unstick device includes one or more unstick electrodes and a control circuitry that causes the unstick electrode to generate vibrational energy to release the cantilever from stiction to a stop pad due to a saturating acceleration input.

In accordance with other aspects of the subject disclosure, an apparatus includes an accelerometer device and an external vibrational stimulator. The accelerometer device consists of a cantilever that moves toward a stop pad in response to an input acceleration and at least one sense electrode that can sense the input acceleration. The external vibrational stimulator generates vibrational energy to cause vibration of the cantilever when the cantilever is stuck to the stop pad.

Various types of signal processing described above can be implemented in digital electronic circuitry, or in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry.

General and special-purpose computing devices and storage devices can be interconnected through communication networks.

Some implementations include electronic components such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards), magnetic and/or solid-state hard drives, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits, such as ASICs or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For purposes of the specification, the terms "display" and "displaying" mean displaying on an electronic device. As used in this specification and any claims of this application, the terms "computer-readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, or declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation, or the processor being operable to monitor and control the operation. Likewise, a processor configured to execute code can be construed as a processor programmed to execute code or operable to execute code.

A term such as an aspect does not imply that such aspect is essential to the subject technology or that such aspect applies to all configurations of the subject technology. A disclosure relating to an aspect may apply to all configurations, or one or more configurations. A term such as "an aspect" may refer to one or more aspects and vice versa. A term such as "a configuration" does not imply that such configuration is essential to the subject technology or that such configuration applies to all configurations of the subject technology. A disclosure relating to a configuration may apply to all configurations, or one or more configurations. A term such as "a configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
   an accelerometer including one or more sense electrodes configured to sense an input acceleration; and
   an unstick device configured to free the accelerometer from a stuck state due to a saturating acceleration input, wherein:
   the unstick device comprises at least one unstick electrode and control circuitry configured to cause the at least one unstick electrode to generate vibrational energy to free the accelerometer, and
   the control circuitry comprises a clip-detection circuit configured to detect stiction.

2. The apparatus of claim 1, wherein the control circuitry is configured to detect the stuck state based on one or more signals from the one or more sense electrodes.

3. The apparatus of claim 2, wherein the accelerometer comprises a microelectromechanical system (MEMS) capacitive accelerometer.

4. The apparatus of claim 1, wherein the accelerometer comprises a pendulous type accelerometer including a cantilever supported by a fulcrum, two sense electrodes and a first unstick electrode at an opposite end of the cantilever from a stop-pad end.

5. The apparatus of claim 4, wherein the pendulous type accelerometer is enclosed in a housing and further includes a second unstick electrode attached to a lid of the housing.

6. The apparatus of claim 4, wherein the pendulous type accelerometer is enclosed in a housing including a lid, and wherein the lid is used as a second unstick electrode.

7. The apparatus of claim 1, wherein the control circuitry comprises a current-to-voltage (C2V) converter, an analog-to-digital converter (ADC) and a wave generator.

8. The apparatus of claim 7, wherein the wave generator is configured to generate a sine wave or a chirp waveform when the clip-detection circuit detects the stuck state of the accelerometer based on a digital signal received from the ADC.

9. The apparatus of claim 8, wherein the digital signal received from the ADC is proportional to a current signal from the one or more sense electrodes, and wherein the clip-detection circuit is configured to compare the digital signal with a digital threshold value.

10. The apparatus of claim 8, wherein the at least one unstick electrode is configured to receive the sine wave or a chirp waveform and to generate the vibrational energy.

11. The apparatus of claim 1, wherein the clip-detection circuit comprises an analog clip-detection circuit and is configured to receive a pulse from a stiction qualifier coupled via a comparator to the C2V converter.

12. The apparatus of claim 1, wherein the clip-detection circuit comprises a digital clip-detection circuit and is configured to receive a pulse from a stiction qualifier coupled via a comparator to an output of a digital filter connected to the ADC.

13. A wireless communication system, the system comprising:
   a processor; and
   an accelerometer apparatus configured to measure an input acceleration, wherein:
      the accelerometer apparatus comprises:
         an accelerometer including at least one sense electrode configured to sense the input acceleration and generate a current signal based on the input acceleration, and
         an unstick device including one or more unstick electrodes and control circuitry configured to cause the one or more unstick electrodes to generate vibrational energy to release the accelerometer from stiction to a stop pad due to a saturating acceleration input, and
      the control circuitry is configured to detect stiction using a clip-detection algorithm executed by the processor.

14. The system of claim 13, wherein the control circuitry is configured to detect the stiction based on the current signal.

15. The system of claim 13, wherein the control circuitry is configured to detect the stiction using the clip-detection algorithm executed by the processor.

16. The system of claim 13, wherein the processor is configured to execute the clip-detection algorithm by comparing a digital version of the current signal with a threshold value and generating an interrupt when the current signal exceeds the threshold value.

17. The system of claim 13, wherein the control circuitry comprises a C2V converter, an ADC, a clip-detection circuit and a wave generator.

18. The system of claim 17, wherein the clip-detection circuit is configured to trigger the wave generator based on detection of the stiction, wherein detection of the stiction is performed by the processor or by using a comparator and a stiction qualifier.

19. An apparatus comprising:
   an accelerometer device comprising:
      a moving element configured to move toward a stop pad in response to an input acceleration;
      at least one sense electrode configured to sense the input acceleration;
      control circuitry comprising a clip-detection circuit configured to detect stiction; and
      an external vibrational stimulator configured to generate vibrational energy to cause vibration of the moving element when the moving element is stuck to the stop pad.

20. The apparatus of claim 19, further comprising a wave generator configured to trigger the external vibrational stimulator to generate vibrational energy, wherein the wave generator is triggered by an interrupt signal, wherein the interrupt signal is an internal interrupt when the wave generator is on board the apparatus, and wherein the interrupt signal is generated by one of a host processor or an on-board clipping detection circuit, when the wave generator is external to the apparatus.

* * * * *